June 15, 1937.  E. McCLANAHAN  2,083,852
PORTABLE COOLING CABINET
Filed Nov. 11, 1935
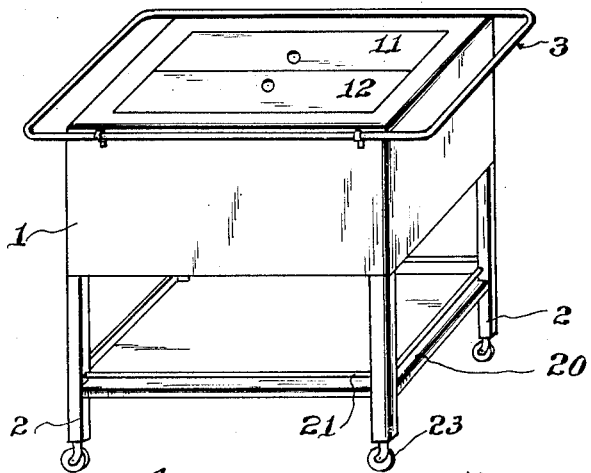
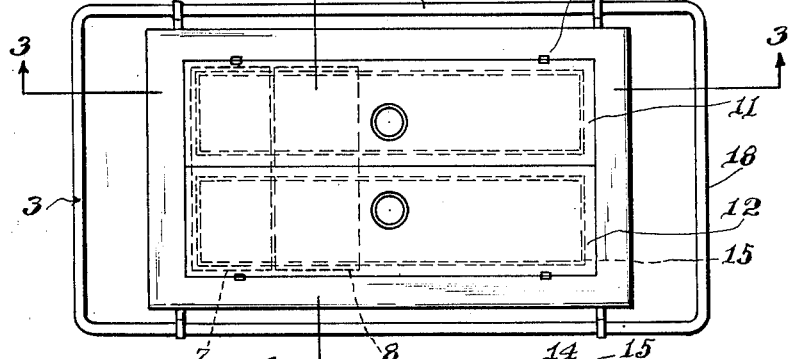
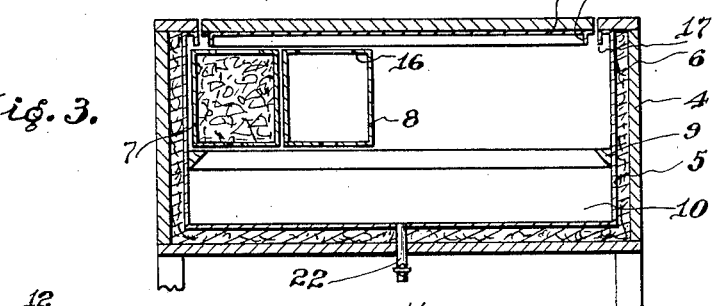
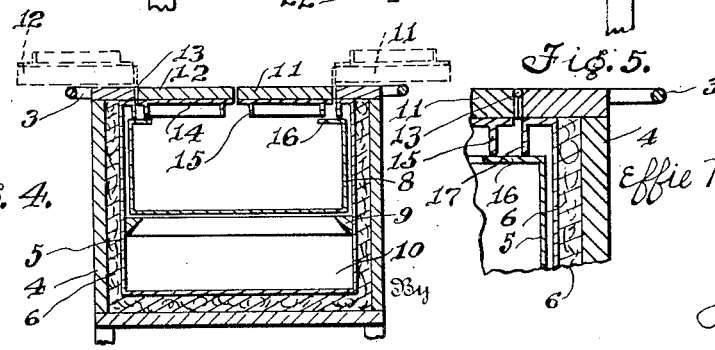
Inventor
Effie McClanahan
By J. Kaplan
Attorney Patented June 15, 1937

2,083,852

UNITED STATES PATENT OFFICE 2,083,852

PORTABLE COOLING CABINET

Effie McClanahan, Jackson, Miss., assignor of one-fifth to Southern United Ice Company, Jackson, Miss., a corporation of New Jersey, and one-fifth to Lester W. Dawley, Jackson, Miss.

Application November 11, 1935, Serial No. 49,311

4 Claims. (Cl. 312—189)

This invention relates to a portable cooling cabinet for soft drinks, foods and the like.

The main object of the invention is to provide a portable cabinet for keeping foods and refreshments in a chilled condition, which can be used for serving purposes and which can be moved around where needed.

Another object of the invention is to provide a cooling cabinet of this kind having a pair of hinged doors which serve as a tray when opened up for holding and dispensing the foods or refreshments.

A further object of the invention is to provide a railing around the cabinet which serves as a handle member for moving the cabinet around, for holding a supply of towels and for supporting the pair of hinged doors in an opened up position.

A further object of the invention is to have the top of the cabinet flat and smooth so it can be used as a table.

A still further object of the invention is to provide a pair of movable compartments for holding cracked ice, for cooling glasses or for holding other food products.

A still further object of the invention is to provide a lower tray surrounded by a railing for holding a supply of glasses.

With the above and other objects in view the invention consists in general of certain novel details of construction and combination of parts hereinafter fully described, illustrated in the accompanying drawing and specifically claimed.

In the drawing:

Figure 1 is a perspective view of the portable cooling cabinet.

Figure 2 is a top view thereof.

Figure 3 is a section on line 3—3 of Figure 2.

Figure 4 is a section on line 4—4 of Figure 2 and

Figure 5 is an enlarged sectional detail of a portion of the cabinet with one of the trays moved to the extreme right.

Referring now to the drawing in detail, numeral 1 designates the cabinet, 2 the leg members and 3 the upper railing surrounding the cabinet. The cabinet comprises an outer box-like structure 4 made of any suitable material such as hardwood or the like and an inner metallic lining member 5 between which is packed a heat insulating medium 6. Within the cabinet is a pair of movable trays 7 and 8 mounted on the track 9. One of the trays is adapted to hold cracked ice to keep the cabinet cold while the other one is arranged to hold salads, lettuce, celery or other food products. The lower portion 10 of the cabinet is designed to hold a supply of bottles containing soft drinks or other bottled refreshments. At the top of the casing are two covers 11 and 12 hinged to concealed hinges 13. When in a closed position the doors are flush with the top of the cabinet so the top can be used as a table. However, when the doors are opened up as shown in dotted lines in Figure 4 the undersides can be used as an extension table or a serving tray. Covering the underside of each of the doors is a metallic bottom lining member 14 provided with a rim 15 to prevent the utensils or dishes from falling off. As the exterior wall of the casing and including the doors are made of highly polished wood, the metallic covering 14 will prevent the bottoms of the doors from being water soaked from exposure and dampness of the ice and besides the said bottoms can be kept in a clean and highly polished condition.

The top edge of the trays 7 and 8 are bent over forming flanges 16. These flanges contact with the rims 15 of the doors when in a closed position, as best seen in Figures 3 and 4, and keep the doors on a level plane with the top face of the casing. The top edges of the inner lining 5 are bent downwardly as at 17 and also contact the flanges 16 of the trays.

As best seen in Figure 2 the short ends 18 of the railing are spaced farther apart from the cabinet than the long ends 19. The short ends 18 are used as handle members for moving the cabinet around and can therefore be a relatively long distance from the edge of the cabinet. However, as the long ends are used to support the covers when in an opened position the distance between these ends and the cabinet is limited so that there will not be too much overhang of the doors. Also the long ends can be used to hang towels or napkins.

Near the bottom of the legs is a lower tray 20 for holding a supply of glasses, dishes or other food serving utensils. Surrounding this tray is a railing 21. A drain 22 leads from the interior of the casing to the atmosphere for draining the moisture therein. A set of casters 23 are mounted at the leg members for rolling the device around.

There has thus been provided a simple and efficient device of the kind described and for the purpose specified.

It is obvious that changes may be made in the form and construction of the invention without departing from the principles involved therein. It is not, therefore, desired to confine the invention to the exact form herein shown and described, but it is desired to include all such as come within the scope of the appended claims:

Having described my invention, I claim:

1. In a device of the class described, a cabinet, a set of hinged doors at the top of said cabinet, the underside of said doors provided with flanges, a set of trays mounted in said cabinet, said trays provided with a bent over portion, said flanges adapted to rest on the bent over portions of said trays when the said doors are in a closed position.

2. In a device of the class described, a cabinet, a set of hinged doors at the top of said cabinet, the underside of said doors provided with flanges, a set of trays mounted in said cabinet, said trays provided with a bent over portion, said flanges adapted to rest on the bent over portions of said trays when the said doors are in a closed position, and a railing surrounding the upper edge of said cabinet to support the doors in an opened position.

3. In a device of the class described, a cabinet, a set of hinged doors at the top of said cabinet, the underside of said doors provided with flanges, a set of trays mounted in said cabinet, said flanges adapted to rest on the top of said trays when the doors are in a closed position.

4. In a device of the class described, a cabinet, a set of hinged doors at the top of said cabinet, the underside of said doors provided with flanges, a set of trays mounted in said cabinet, said flanges adapted to rest on the top of said trays when the doors are in a closed position, and a railing surrounding the upper edge of said cabinet to support the doors in an opened position.

EFFIE McCLANAHAN.